United States Patent
Bellur et al.

(10) Patent No.: US 8,819,414 B2
(45) Date of Patent: Aug. 26, 2014

(54) THREAT MITIGATION IN A VEHICLE-TO-VEHICLE COMMUNICATION NETWORK

(75) Inventors: Bhargav R. Bellur, Bangalore (IN); Debojyoti Bhattacharya, Bangalore (IN); Aravind V. Iyer, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 800 days.

(21) Appl. No.: 12/762,428

(22) Filed: Apr. 19, 2010

(65) Prior Publication Data

US 2011/0258435 A1 Oct. 20, 2011

(51) Int. Cl.
  *H04L 29/06* (2006.01)
  *H04L 9/32* (2006.01)

(52) U.S. Cl.
  CPC .......... *H04L 9/3273* (2013.01); *H04L 63/0823* (2013.01); *H04L 63/0869* (2013.01); *H04L 2209/84* (2013.01); *H04L 9/3268* (2013.01); *H04L 2209/80* (2013.01)
  USPC ............................ 713/155; 713/158; 713/169

(58) Field of Classification Search
  CPC ............ H04L 2209/80; H04L 63/0823; H04L 9/3273
  USPC .......................................................... 713/155
  See application file for complete search history.

(56) References Cited

U.S. PATENT DOCUMENTS

| | | | |
|---|---|---|---|
| 2002/0133716 A1* | 9/2002 | Harif | 713/201 |
| 2003/0097477 A1* | 5/2003 | Vossler | 709/248 |
| 2005/0055487 A1* | 3/2005 | Tanaka et al. | 710/303 |
| 2006/0255910 A1* | 11/2006 | Fukushima et al. | 340/5.65 |
| 2007/0223702 A1* | 9/2007 | Tengler et al. | 380/270 |
| 2008/0027602 A1* | 1/2008 | Yeap et al. | 701/29 |
| 2008/0148374 A1* | 6/2008 | Spaur et al. | 726/6 |
| 2008/0150685 A1* | 6/2008 | Desai et al. | 340/5.61 |
| 2008/0167773 A1* | 7/2008 | Gumpinger et al. | 701/33 |
| 2008/0232595 A1* | 9/2008 | Pietrowicz et al. | 380/277 |
| 2008/0275991 A1* | 11/2008 | Matsuzaki et al. | 709/225 |
| 2009/0201139 A1* | 8/2009 | Zimmermann et al. | 340/426.13 |
| 2009/0260057 A1* | 10/2009 | Laberteaux et al. | 726/2 |
| 2010/0031025 A1* | 2/2010 | Zhang et al. | 713/156 |
| 2010/0031042 A1* | 2/2010 | Di Crescenzo et al. | 713/169 |
| 2010/0037057 A1* | 2/2010 | Shim et al. | 713/171 |
| 2010/0205429 A1* | 8/2010 | Alrabady et al. | 713/156 |

FOREIGN PATENT DOCUMENTS

CN  1679103 A  10/2005

* cited by examiner

*Primary Examiner* — Ashok Patel
*Assistant Examiner* — Gary Gracia

(57) ABSTRACT

A method is provided for obtaining a certificate revocation list (CRL) for a vehicle in a vehicle-to-vehicle communication system. A portable security unit is provided to access secured operations for the vehicle. The portable security unit is linked to a device having access to a communication network. The communication network is in communication with a certificate authority for issuing an updated CRL. The updated CRL is downloaded from the certificate authority to the portable security unit. At a later time, when a user enters the vehicle, a communication link is established between the portable security unit and a vehicle processor unit. Mutual authentication is exchanged between the portable security unit and the vehicle processing unit. The updated CRL stored in the portable security unit is downloaded to a memory of the vehicle communication system in response to a successful mutual authentication.

19 Claims, 2 Drawing Sheets

THREAT MITIGATION IN A VEHICLE-TO-VEHICLE COMMUNICATION NETWORK

BACKGROUND OF INVENTION

An embodiment relates generally to a vehicle-to-vehicle communication system.

The use of certificate revocation lists (CRLs) for certificate validity checks in the internet has motivated the use of CRLs in other contexts such as vehicle-to-vehicle communications. Due to the intermittent connectivity with a certificate authority due to vehicles not being within a communication range of roadside equipment which provide accessibility to the certificate authority, a revoked status of a certificate at a verifier may not be up-to-date resulting in acceptance of messages signed using a revoked certificate. In vehicle communication systems, communication with the roadside equipment is used to obtain a CRL. However, if the vehicle is not in communication often with the roadside equipment, then the vehicle may not obtain the up to date listings of the CRL.

SUMMARY OF INVENTION

An advantage of an embodiment is the retrieval of an updated certificate revocation list by use of a communication network other than the vehicle communication system and the roadside equipment communication channel. The user of a vehicle may establish a communication link with a certificate authority utilizing a communication network such as the internet for downloading an updated CRL at the user's request.

An embodiment contemplates a method of obtaining a certificate revocation list (CRL) for a vehicle in a vehicle-to-vehicle communication system. A portable security unit is provided to access secured operations for the vehicle. The portable security unit is linked to a device having access to a communication network. The communication network is in communication with a certificate authority for issuing an updated CRL. The updated CRL is downloaded from the certificate authority to the portable security unit. A communication link is established between the portable security unit and a vehicle processor unit. Mutual authentication is exchanged between the portable security unit and the vehicle processing unit. The updated CRL stored in the portable security unit is downloaded to a memory of the vehicle communication system in response to a successful mutual authentication.

An embodiment contemplates a vehicle-to-vehicle communication system. A vehicle communication processing unit for controlling a broadcast of wireless messages within the vehicle-to-vehicle communication system. The vehicle communication processing unit has a memory for storing certificate revocation lists. A portable security unit links to the vehicle processing unit. The portable security unit communicates with the processing unit for performing mutual authentication between the portable security unit and the vehicle communication processing unit in response to being linked to one another. The portable security unit has a non-volatile memory for storing packet transcripts as well as an updated certification revocation list. The portable security unit links to a device having access to a communication network. The communication network is in communication with a certificate authority for uploading packet transcripts from the portable security unit to the Certifying Authority (CA) and downloading updated CRLs from the CA to the portable security unit. The portable security unit establishes a communication link to the vehicle communication system in response to initiating a vehicle security operation. The updated CRL stored in the portable security unit is downloaded to the memory of the vehicle communication system in response to the mutual authentication between the portable security unit and the vehicle processing unit.

DETAILED DESCRIPTION

Figure 1:
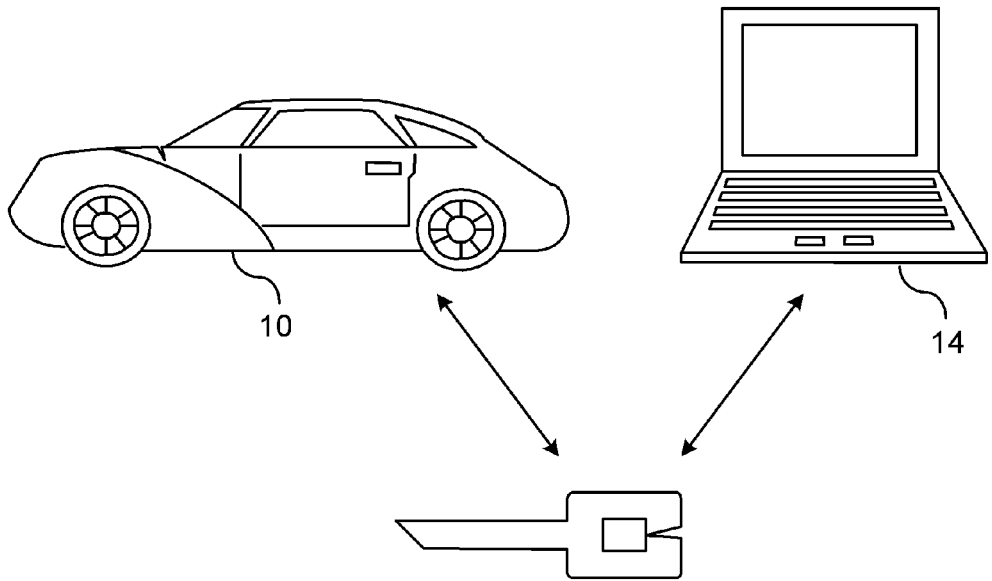
FIG. 1 is an exemplary schematic of the communication devices utilized in a CRL retrieval system according to an embodiment.

There is shown in FIG. 1 a vehicle-to-vehicle communication system (V2V). The V2V communication system readily downloads updated certificate revocation lists (CRL) from a source other than roadside equipment which is typically the primary communication interface device for updating CRLs. The V2V communication system includes a host vehicle in communication with one or more remote entities. The remote entities may be a remote vehicle or a RSE. It should be understood that each vehicle considers itself a host vehicle with respect to vehicles that are remote from the host vehicle. Therefore, the term host vehicle is utilized in the context a respective vehicle that is the focus of the description herein.

A CRL is a list of digital certificates that have been revoked or are no longer valid. The host vehicle receiving a message from a remote entity for which the digital certificate has been revoked or is no longer valid should not be relied on and the message should be disregarded. A digital certificate may be revoked for several reasons including, but not limited to, a certificate authority (CA) improperly issuing the certificate, misbehavior by the certificate holder including violations of policies specified by the CA, or if the private-key is thought to be compromised (i.e., known by any entity other than the entity the key was issued to).

The CRL is regenerated and republished on a periodic basis or may be done so after a digital certificate has been revoked. The digital certificate may also have expiration dates which may be examined for determining a validity of the digital certificate. Digital certificate status should be checked whenever a requesting entity wants to rely on a digital certificate; otherwise, a message signed by an entity holding a (revoked) digital certificate may be wrongly accepted as relied on. Therefore, it is pertinent to have a latest listing of the CRL. The issue in vehicle communications is that vehicles are not in continuous communication with roadside entities or other communication devices (i.e., due to broadcast range). Therefore updating the CRL may occur only when the vehicle is within a communication range of the RSE.

The embodiments described herein provide an effective technique for threat mitigation in a vehicle-to-vehicle communication network by having a mechanism for frequent connectivity between the CA and the vehicles. The need for frequent connectivity between the CA and vehicle provides several advantages. First, if users (i.e., vehicles in the network) can contact the CA frequently, then updated transcripts of vehicle-to-vehicle communications can be uploaded to aid the CA in detecting misbehaving vehicles that serve to build revocation lists. A transcript is a digest of messages received via a DSRC antenna over a specific duration of time. The transcript can be exhaustive (e.g., includes all messages received), random (e.g., includes a random fraction of the messages received), or selective (e.g., includes only the messages a vehicle perceives as suspicious or anomalous). By not uploading transcripts of suspicious messages for long periods of time, leads to delays in identifying and revoking misbehaving identities. Secondly, users can download up-to-date revocation information by frequently interacting with the CA. Getting revocation information after long periods of time leads to a "window of vulnerability" where a user may accept packets from a revoked entity. In addition, another advantage of frequent interaction between the CA and the vehicles provides increased levels of privacy. Moreover, migration across geographical regions is facilitated by assigning certificates that are specific to the geographical region. In particular, users can refresh their identities/credentials often enough to improve privacy.

Figure 2:
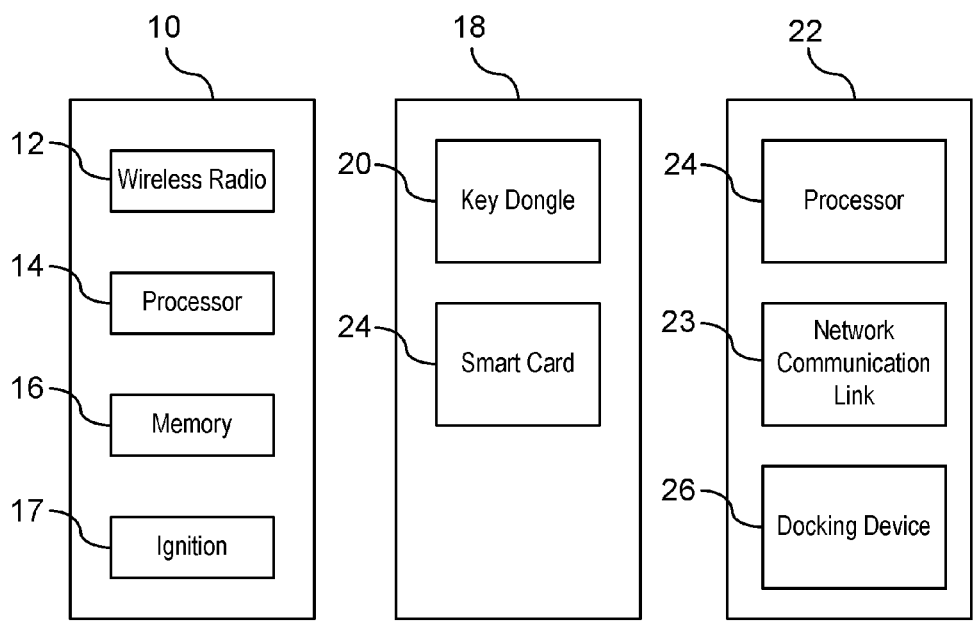
FIG. 2 is a block diagram of the CRL retrieval system according to the embodiment.

Referring both to FIGS. 1 and 2, a vehicle 10 is shown having V2V or vehicle-to-entity (V2X) communication capabilities. The vehicle 10 includes a wireless radio 12 (e.g., rear end of a receiver) that includes a transmitter and a receiver (or transceiver) for transmitting and receiving the wireless messages. The vehicle 10 further includes a processing unit 14 (e.g., protocol stack) for processing the data received in a received wireless message or other wireless devices such as a global positioning system (GPS) receiver. The processing unit 14 may include, but is not limited to, an electronic control unit (ECU), for controlling access to a vehicle, and moreover, an engine start operation of the vehicle. The V2V communication system also includes a memory 16 for storing data such as CRLs which are used for determining whether a digital certificate is revoked.

The processing unit 14 of the V2V communication system communicates with a portable security unit 18. The portable security unit 18 is preferably integrated as part of a vehicle ignition key for accessing the interior of a vehicle and to actuate the starting of an engine of the vehicle. Alternatively, the portable security unit may be a standalone device or integrated as part of another component. The portable security unit 18 includes a dongle 20. The dongle 20 is a small piece of portable hardware that communicates with a network device 22, such as a computer, and is linked to a communication network 23 and additionally the processing unit 14. The dongle 20 is preferably co-located with the vehicle's ignition key for communication with the processing unit 14 of the vehicle. The dongle 20 includes memory 24, such as a smart card, flash memory, or the like for storing codes to access the vehicle functions and for storing updated CRLs as well as packet transcripts.

The dongle 20 when linked to the network device 22 accesses the communication network 23 for uploading packet transcripts and downloading an updated CRL from a certificate authority. The dongle 20 utilizes a docking device 26 for communicating with the network device 22 (e.g., computer). The docking device 26 may utilize a wired connection or a wireless connection for communication with the network device 22. The network device 22 further includes a processor 24 for controlling the communication with the CA via the communication network 23. The communication network 23 may include the internet or any other communication medium. The network device 22 is used to communicate with the CA for uploading packet transcripts and obtaining an updated CRL upon the user's request. The updated CRL is downloaded from the CA via the device 22 to the dongle 20. The dongle 20 stores the downloaded CRL in the memory 24. The dongle 20 is removed from the docking station 26 after a successful download of the CRL from the CA. In addition, cryptographic credentials or additional certificates in the form of a pseudonym may be downloaded from the CA to vehicle. The pseudonym does not contain any personal or identifying information pertaining to the vehicle, but enables the vehicle to execute security protocols necessary to send and receive V2V messages. This enhances the privacy of a user in the V2V communication system. Messages signed using cryptographic material corresponding to a respective pseudonym would generally be appended with the respective pseudonym for the receiving party to verify authenticity of the messages. An observer would be able to link messages sent by a respective vehicle so long as a vehicle uses the same pseudonym. A vehicle can get anonymity by using each pseudonym for a short amount of time and request fresh sets of pseudonyms from the CA periodically.

Upon the user entering the vehicle, the portable security unit 18 links to the vehicle processing unit 14. In the preferred embodiment, linking the portable security unit 18 to the vehicle processing unit 14 may be initiated by inserting the ignition key into the vehicle ignition 17 for mutual authentication between the dongle and the vehicle processing unit 14. Upon a successful authentication, the updated CRL is downloaded from the dongle 20 to the processing unit 14 of the vehicle. The processing unit 14 utilizes the updated CRL to determine whether the digital certificate of the received message is revoked.

Prior to transmitting the updated CRL a centralized malicious node detection system executing on a back end server analyzes received packet transcripts. The centralized malicious node detection system detects anomalies in the vehicle-to-vehicle communication system.

Figure 3:
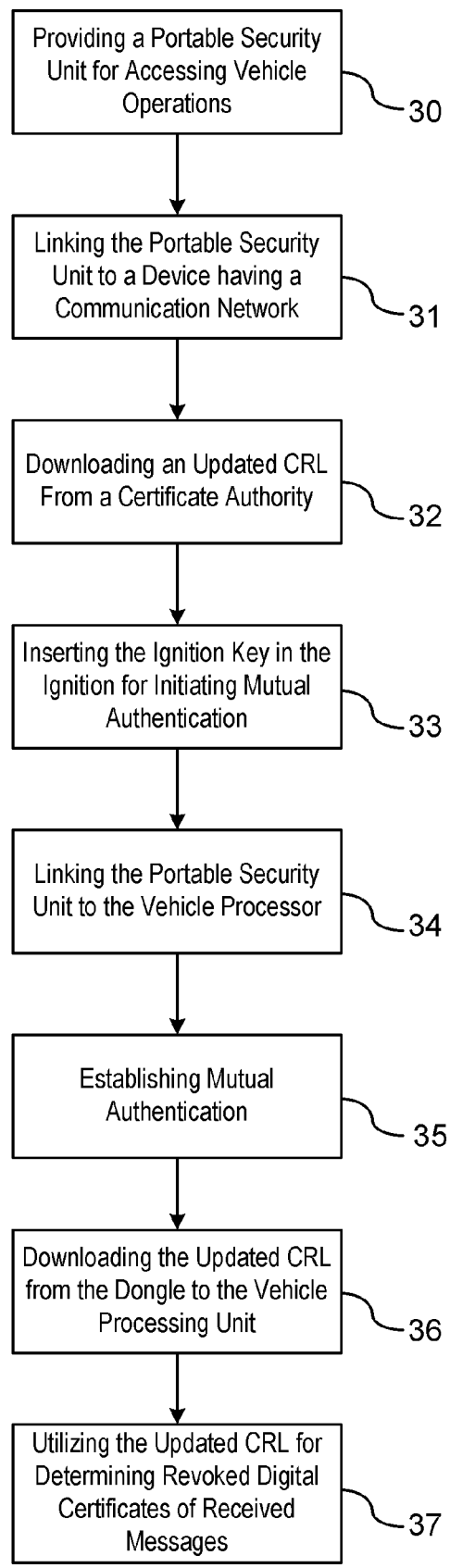
FIG. 3 is a flow chart of a method for updating the CRL according to the embodiment.

FIG. 3 illustrates a flowchart of a method for updating a CRL of a vehicle in a V2V or V2X communication system. In step 30, a portable security unit is provided for accessing a secured vehicle operation of a vehicle. The portable security unit may be integrated with an ignition key. Alternatively, the portable security unit may be integrated with another device or may be a standalone device. The portable security unit includes a dongle which is used to store one or more codes for accessing the secure operations.

In step 31, the portable security unit is linked to a network device having communication link with a communication network. The network device may include, but is not limited to, a computer, a phone, a personal digital assistant. The portable security unit may establish communication with the network device using a docking station. The docking station may utilize a wireless or wired connection to the network device (e.g., computer).

In step 32, the network device, such as the computer, accesses communication with a certificate authority (CA). Based on anomalies detected in received packet transcripts, the certificate authority has the responsibility of issuing updated CRLs. Certificates listed in the CRL are digital certificates that have been revoked due to expiration, malicious behavior, or a private key being compromised. The computer downloads an updated CRL for a localized region at the request of the user.

In step 33, a mutual authentication between the dongle and the vehicle processor is initiated for enabling a secure operation such as an engine start operation. Establishing mutual authentication may include the ignition key being inserted within the ignition for initiating an engine start operation. The dongle integrated within the ignition key or portable security device communicates with the vehicle processor for mutual authentication.

In step 34, a link between the portable communication device and the vehicle processor is established in response to an initiation of a vehicle operation or secure operation (e.g., inserting the ignition key within the ignition).

In step 35, mutual authentication is established. A successful authentication occurs when the portable security unit authenticates the vehicle communication processor, and when the vehicle communication processor authenticates the portable secure device.

In step 36, an updated CRL is downloaded from the dongle to the vehicle processor after the mutual authentication by both devices. In addition, cryptographic credentials or additional certificates in the form of a pseudonym may be downloaded from the CA to vehicle. Moreover, updated transcripts of vehicle-to-vehicle communications can be uploaded to aid the CA in detecting misbehaving vehicles that serve to build revocation lists.

In step 37, the CRL is stored in the vehicle processor memory, or the like, and is used to check whether digital certificates associated with messages received by the vehicle are revoked. If a digital certificate is revoked, the message is disregarded. If the digital certificate for a received message is not revoked, then the message is accepted or retained for additional processing.

While certain embodiments of the present invention have been described in detail, those familiar with the art to which this invention relates will recognize various alternative designs and embodiments for practicing the invention as defined by the following claims.

What is claimed is:

1. A method of obtaining a certificate revocation list (CRL) for a vehicle in a vehicle-to-vehicle communication system, the method comprising the steps of:
   providing a portable security unit to access secured operations for the vehicle, the portable security unit being relocatable from the vehicle;
   linking the portable security unit to a network device having access to a communication network, wherein the network device is remote from the vehicle, wherein the communication network is separate from the vehicle-to-vehicle communication system, and wherein the communication network is in communication with a certificate authority for issuing an updated CRL;
   downloading the updated CRL from the certificate authority to the portable security unit via the communication network;
   establishing a communication link between the portable security unit and a vehicle processor unit;
   exchanging mutual authentication between the portable security unit and the vehicle processing unit, wherein the updated CRL stored in the portable security unit is downloaded to a memory of the vehicle in response to a successful mutual authentication; and
   wherein establishing the link between the portable security unit and a vehicle processing unit is initiated by inserting an ignition key in a vehicle ignition.

2. The method of claim 1 wherein the portable security unit communicates with the communication network via a wired connection.

3. The method of claim 1 wherein the portable security unit communicates with the communication network via a wireless connection.

4. The method of claim 1 wherein the network device communicates with certificate authority via an internet.

5. The method of claim 1 wherein the portable security unit utilizes a docking device to communicate with the network device.

6. The method of claim 1 wherein the updated CRL is stored in a memory card of the portable security unit when downloading the updated CRL from the certificate authority to the portable security unit.

7. The method of claim 1 wherein the updated CRL is computed by a centralized malicious node detection system running on a back-end server.

8. The method of claim 1 wherein the centralized malicious node detection system detects anomalies in the vehicle-to-vehicle communication system.

9. The method of claim 1 wherein packet transcripts are uploaded from the portable security unit to the certificate authority to assist in detecting anomalies in the vehicle-to-vehicle communication system.

10. The method of claim 1 wherein cryptographic credentials are downloaded from the certificate authority to vehicles for providing enhanced privacy to users in the vehicle-to-vehicle communication system.

11. A vehicle-to-vehicle communication system comprising:
   a vehicle communication processing unit for controlling a broadcast of wireless messages within the vehicle-to-vehicle communication system, the vehicle communication processing unit having a memory for storing certificate revocation lists (CRL); and
   a portable security unit for linking to the vehicle processing unit, the portable security unit being relocatable from the vehicle, the portable security unit communicating with the processing unit for performing mutual authentication between the portable security unit and the vehicle communication processing unit in response to being linked to one another, the portable security unit having a non-volatile memory for storing an updated certification revocation list;
   wherein the portable security unit links to a network device having access to a communication network, the network device being remote from the vehicle, the communication network being separate from the vehicle-to-vehicle communication system, and the communication network being in communication with a certificate authority for issuing an updated CRL, wherein the updated CRL is downloaded from the certificate authority to the portable security unit via the communication network, wherein the portable security unit establishes a communication link to the vehicle communication system in response to initiating a vehicle security operation, and wherein the updated CRL stored in the portable security unit is downloaded to the memory of the vehicle in response to the mutual authentication between the portable security unit and the vehicle processing unit; and
   wherein the portable security unit and the vehicle communication processor exchanges mutual authentication in response to an ignition key being inserted within an ignition.

12. The vehicle-to-vehicle communication system of claim 11 wherein the portable security unit includes a key dongle.

13. The vehicle-to-vehicle communication system of claim 12 wherein the key dongle is integrated as part of the ignition key.

14. The vehicle-to-vehicle communication system of claim 13 further comprising a docking device for communication with the network device.

15. The vehicle-to-vehicle communication system of claim 14 wherein the network device for downloading the updated CRL from the communication network includes a computer.

16. The vehicle-to-vehicle communication system of claim 14 wherein the network device for downloading the updated CRL from the communication network includes a phone-based device.

17. The vehicle-to-vehicle communication system of claim 12 wherein the key dongle includes a memory card for storing the updated CRL download.

18. The vehicle-to-vehicle communication system of claim 11 wherein a centralized malicious node detection routine is used to detect anomalies in the vehicle-to-vehicle communication network.

19. The vehicle-to-vehicle communication system of claim 11 wherein the memory stores packet transcripts of vehicle-to-vehicle communications that are uploaded to the certificate authority to assist in detecting anomalies in the vehicle-to-vehicle communication system.

* * * * *